US005152858A

United States Patent [19]

Winter

[11] Patent Number: 5,152,858

[45] Date of Patent: Oct. 6, 1992

[54] METHOD AND DEVICE FOR SPLICING WEBS ON WHICH LABELS ARE PRINTED

[75] Inventor: Horst Winter, Neutraubling, Fed. Rep. of Germany

[73] Assignee: Krones AG Hermann Kronseder Maschinenfabrik, Neutraubling, Fed. Rep. of Germany

[21] Appl. No.: 686,194

[22] Filed: Apr. 16, 1991

Related U.S. Application Data

[62] Division of Ser. No. 550,395, Jul. 10, 1990, Pat. No. 5,039,374.

[30] Foreign Application Priority Data

Jul. 13, 1989 [DE] Fed. Rep. of Germany ....... 3923163

[51] Int. Cl.[5] ............................................ B32B 31/00

[52] U.S. Cl. .................................. 156/157; 156/505; 156/506

[58] Field of Search ............... 156/157, 504, 505, 506, 156/507, 508

[56] References Cited

U.S. PATENT DOCUMENTS 3,565,731 2/1971 Schmermond ..................... 156/504
3,717,057 2/1973 Takimoto ........................... 156/505
4,067,760 1/1978 Nelson ................................ 156/504
4,106,974 8/1978 Hirsch ................................. 156/507
4,219,378 8/1980 Marschke ............................ 156/505
4,264,401 4/1981 Ganz ................................... 156/505
4,390,388 6/1983 Nagata et al. ....................... 156/504
4,492,609 1/1985 Blom ................................... 156/507

*Primary Examiner*—David A. Simmons
*Assistant Examiner*—James J. Engel, Jr.
*Attorney, Agent, or Firm*—Fuller, Ryan, Hohenfeldt & Kees

[57] ABSTRACT

A splicing device for label webs mechanically holds the leading end of the new web and is rapidly transferred to splicing position and accelerated into the running speed of the web while the rotational speed of the web supply spool that is associated with the leading end of the replacement web is initially gradually adjusted to the running speed of the label web. The leading end of the replacement web and the trailing end of the expiring web are glued in an overlapping manner. The splicing device has two identically constructed multi-functional drums which are arranged to function alternately and are equipped with a gripper, cutter, free running deflector roller and pressure application device.

5 Claims, 5 Drawing Sheets

METHOD AND DEVICE FOR SPLICING WEBS ON WHICH LABELS ARE PRINTED

This is a divisional of copending application(s) Ser. No. 07/550,395 filed on Jul. 10, 1990, now U.S. Pat. No. 5,039,374 issued Aug. 13, 1991.

BACKGROUND OF THE INVENTION

The invention disclosed herein relates to a method and device for splicing webs on which labels are printed so as to provide an uninterrupted supply of labels to a machine which applies labels to containers such as bottles and cans.

A known method and device for splicing the leading end of a web fed from a standby spool or reel to the trailing end of a web fed from an alternative active storage spool on which the supply web is nearly exhausted is described in German DE-OS 31 09 529. This known device features a grooved web cutting drum and two gluing drums. The cutting drum can be adjusted with respect to the web supply spool or reel and one of the gluing drums can be lowered such that it can be tangential to the cutting groove drum and the other glue drum. A cutting device that is moved perpendicular to the label web toward the grooved cutting drum is associated with the grooved cutting drum. At least two rollers that deflect or change the direction of the label web are arranged between the splicing device and the supply spool. A scanning device that scans the label image printed on the web is associated with the supply spool and is upstream of the splicing device in order to properly position the splice. To achieve this, a drive roller swivels toward the full supply spool and simultaneously the grooved cutting drum is swiveled tangentially to the supply spool, and one of the other gluing drums is swiveled tangentially to the grooved cutting drum and the other gluing drum. The leading end of the replacement web that belongs to the supply spool adheres firmly to the grooved cutting drum when it is sufficiently proximate to the full supply spool and is transferred from there to a splicing position that is properly positioned and parallel to the web that is near depletion with the aid of the scanning devices. Following such positioning, the leading end of the replacement web or substitute web and the end of the presently running web are cut by means of a cutting device, whereby the section of the leading end of the web located behind the cutting position is held on the grooved cutting drum by means of a vacuum bar. Further rotation of the grooved cutting drum brings about application of adhesive tape in succession to both sides of the line where cutting is done by means of the gluing drum, so that the trailing and leading ends of the respective nearly consume and substitute webs are adhered flush with each other. After the splicing has been completed, the full supply spool is swiveled into position away from the grooved cutting drum.

The disadvantages of the method just outlined is complicated in its implementation and the implementation device has a complicated design. Furthermore, a properly positioned splice apparently can only be achieved with difficulty, since slippage of the leading end of the replacement web that is merely glued to the grooved cutting drum can occur as a result of the high acceleration of the web to match the momentary speed of the web which is about to become depleted or run out. Slippage between the leading end of the web and the grooved cutting drum is more often the rule than the exception. With the known procedure, flush gluing is only possible with strips of adhesive tape These strips are applied to both sides of the web, which, at least on the outer part of the web, or the visible surface of the web, is not desirable from an aesthetic point of view. Splicing with liquid adhesives is not possible in this known design. Furthermore, cutting of the web takes place prior to connecting the leading end of the replacement web to the trailing end of the expiring web, whereupon relatively significant mechanical effort is expended It is also disadvantageous that the cutting device used to cut through the web undergoes a movement transverse to the direction of the motion of the web, and must engage in a cutting groove on the grooved cutting drum. Carrying out splicing on a labeling machine operating under normal conditions, therefore, does not appear to be possible. In the web splicing method and device disclosed in German DE OS 24 56 342 the leading end of the replacement web is maintained in a state of readiness by a vacuum drum and is transferred into the splicing position parallel to the end of the web that is running out. Slippage of the leading end of the web on the drum due to high accelerating forces and the large moment of inertia of the web supply spool, cannot be avoided, so a properly positioned splice is not assured under all conditions. There is also a danger after cutting both the expiring web and the replacement web, the web that faces the cutting drum will stick out tangent to the drum as a result of the curvature of the cutting drum, so that flush gluing of the web at the cutting point is more difficult and, perhaps, not even possible.

A method and device are also known from European patent application EP-A2 0 273 286 wherein the webs can be connected flush with each other by means of strips of adhesive tape. Because a movable gluing block is provided in this case and is perpendicular to the direction in which the web is being withdrawn, the splicing of the label webs is, if at all, only possible at low web withdrawal speeds.

SUMMARY OF THE INVENTION

An objective of the invention is to provide a method for splicing a moving label web which can be carried out in a simple manner to produce a properly positioned splice and to implement the method with a device having a simple construction.

Since, in the new splicing device, the leading end of the replacement web is held on the splicing device by mechanical means, the leading end can be accelerated rapidly into the splicing position. The leading end of the replacement web is firmly held under all operating conditions of the splicing device and secured against slippage. Due to the high mass and correspondingly high moment of inertia of the web advancing mechanism, the rotational speed of the web handling rollers can initially only be gradually adjusted to the web withdrawal speed, a compensating roller is arranged between the supply spool and the splicing device, so that during the sudden transfer of the leading end of the replacement label web into splicing position there will be no excessively high tension on the web which could lead to slippage of the leading end on the splicing device, or to tearing of the web. A new method which is not complicated results from the previously mentioned features of the method and these features ensure a properly positioned splice without the need to sort out any container due to incorrect or unreadable labeling.

It is furthermore advantageous if the leading end of the replacement web and trailing end of the depleted or running out web are glued by forming an overlapping area in preference to using adhesive tape to connect the leading end of the replacement web to the trailing end of the expiring or depleting web. Of course, with overlapping of the web ends according to the invention, adhesive tape as well as liquid glue can be used. Since the leading end of the replacement web, as mentioned earlier, can be accelerated rapidly up to the label web unwinding speed independent of the supply spool, splicing while the labeling machine is operating, that is, without forfeiting labeling capacity is achieved. Hence, the new method is particularly economical. As a result of cutting of the trailing end of the web that is expiring only immediately after gluing of the new web, no additional fastening devices to fix the web ends are necessary.

As a result of the new splicing device using two identically constructed multi-functional drums, the splicing device is also simple and sturdy in construction. A reciprocal interchange of the drums or any part thereof is readily possible so that in addition to low production costs, maintenance and repair costs are also low. The construction of the splicing device is also simplified by the multi-functionality of the drums, since the entire splicing device consists essentially of only two parts which engage the leading end of the replacement web, transfer it into splicing position, connect it to the trailing end of the expiring web, cut the end of the web and allow for redirection of the label web from the delivery spool to a labeling machine. A number of functions and parts are thereby integrated into only two drums. An additional cutting device is thus eliminated as are additional deflection or web direction changing rollers. It is, furthermore, advantageous that the whole splicing operation is carried out with rotating parts so the shock effects that could otherwise occur when reversible translating parts are used is avoided. Complicated sequences of movement such as, for example, swiveling the individual parts back and forth, or any movement transverse to the direction in which the web is unwinding are eliminated. Splicing the leading end of the replacement web to the trailing end of the depleted or run out web is thus possible without problems even though the label web is running at full speed; that is, there is no diminished performance of the labeling machine.

Additionally, before transferring the leading end of the web into the splicing position, a double adhesive tape or liquid adhesive material is applied to the trailing end of the expiring web. This permits use of a type of gluing which would be provided in any event by a label machine arranged downstream of the splicing device, but at the point of the splice operation. Additional adhesives are therefore not necessary, so that overall lower installation and operating costs can be expected. Furthermore, the operating personnel need not be trained in the use of another type of adhesive.

It is also a feature of the invention to glue the leading end of the replacement web first to release the leading end from the splicing device at the moment of adhesive contact and to cut the label web that is running out or depleted and which is located upstream of the gluing position immediately after gluing the leading and trailing ends of the label webs. This procedure assures that the beginning or leading end of the replacement web does not slip when it is being transported from operating position into splicing position nor during the gluing procedure. Furthermore, as a result of the overlapping of the leading end of the replacement web and the trailing end of the web that is running out where they are glued only the trailing end of the unwinding depleted label web needs to be cut, so that the necessary web tension is not adversely affected by the cutting procedure. The web tension remains nearly constant during the entire splicing operation, which has a beneficial effect on proper splice positioning.

According to the design of the new splicing device the masses of the splicing device which are to be accelerated are relatively small and the splicing procedure is ended only after a very short impulse movement. Since rotational parts can be rapidly adjusted to the continuous operating speed of the label web, this procedure promotes the properly positioned splicing of the leading and trailing ends of the webs under all operating conditions.

As a consequence of overlapping the glued ends of the depleting and replacing webs, the printed side of the leading end region of the replacement web must be glued to the unprinted backside of the web that is depleting or expiring and, during the resulting change, the leading end of the replacement web with its unprinted backside must be glued to the printed side of the trailing end of the web. In order to assure properly positioned splicing during transfer of the supply spool, it is particularly advantageous that the web which is glued with the printed side to the unprinted side of the depleted label web by overlapping gluing, is cut in advance by the width of the overlapping area, since the printed leading end of the web as seen by the viewer of the label is arranged on the unprinted backside of the label and is therefore not visible to the viewer. In the case where the unprinted side of the leading end of the replacement web is glued to the printed side of the trailing end of the expiring web, the overlapping area could also be noticed by the viewer of the label, and in this case becomes a matter of properly positioning the splice. A leading end of the web that has previously been cut by the overlapping area is eliminated in the latter case. A properly positioned image is thus assured in all splicing positions.

With the help of the gripping, cutting, deflection and pressure application devices each of the two multi-functional drums carry out a number of functions so that the entire splicing device consists of only a few movable parts and is constructed so as to permit a simple overview.

Since the two previously mentioned multi-functional drums are driven synchronously in counterrotation during operation of the splicing device, a reciprocal functional enhancement of the individual drum functions is possible. This is also assured by means of having each drum, during the splicing operation, rotate approximately 180°. Since the gripping, cutting, deflection or web directional changing devices and application devices are all within the perimeter of the drums and are arranged so as to function on the circumference of the drum, the result is a compact splicing device with a plurality of integrated functions. Since both multi-functional drums are identical in design and are rotated 180° around an axis that connects both drums, both drums can, if required, be reciprocally interchanged. The same replacement parts are used on each drum which means that parts inventory costs can be minimized.

A further advantage of the device results from the gripping device for the replacement web being designed with gripping fingers and counterpressure elements which can be swiveled around the swivel axis of a swivel bearing from a position of readiness into an operating position and conversely. The gripper fingers are simple in design and provide the non-slip fastening of the leading end of the replacement web on the drum during swiveling from readiness position into operating position. The closing force is transferred from the counterpressure element to the gripper finger with the aid of a compression spring, whereby the gripper fingers can be pressed against the web without damaging it. A plurality of gripper devices are arranged in parallel which results in secure gripping of the leading end of the replacement label over the entire axial width of the drum.

It is also advantageous that the cutting device has a knife holder and an associated knife and that the knife holder is also provided with a counter pressure application surface in the area of the circumference of the drum. Since the knife projects at least to some extent beyond the circumference of the drum and extends axially along the entire drum length, cutting of the total width of the end of the web is assured. Since a fixed countercutter with a counterknife holder and a counterknife is arranged between the drums, the knife of each drum that projects over the circumference of each drum can function together with a countercutter. Any type of radial movement of the knife or of the counterknife is eliminated. The cutting operation can only take place with a rotational movement of the drum. A separate drive for the cutting device is eliminated, since the knife and counterknife cut the end of the web by reason of the drum turning.

It is further advantageous that the web direction changing or deflection arrangement is designed as a freely rotating supported roller, the outer jacket of which in part projects beyond the circumference of the drum. As a result, at least one guide roller attached outside of the splicing device is eliminated, said guide roller being integrated with the drum according to the invention.

Secure adhesion of the leading and trailing ends of the webs, respectively, can be achieved by simple means with the aid of a pressure applicator device that is at the circumference of the drum and reacts against an anvil or counterpressure application surface. Moreover, the pressure applicator and counterpressure application surfaces roll against one another which has the beneficial effect on the application pressure and the durability or integrity of the glued connection. The diametrically opposed arrangement of the pressure application/counterpressure application surface permits the reciprocal support of the drums at the moment of the gluing operation, so that durable overlapping adhesion is assured.

It is also beneficial that each multi-functional drum is provided with its own web spool and that there is a compensating roller between the supply spool and the drum. Rapid acceleration of the leading end of the replacement web from readiness position into the splicing position is thereby made possible with a simultaneous initial gradual adaptation of the rotational movement of the supply spool to the continuous web withdrawal speed. The difference in speed that exists between the leading end of the replacement web and the supply spool at the beginning of the splicing operation is compensated by means of the swiveling compensating rollers simply by shortening the label web path between the splicing device and the supply spool. The splicing operation can take place without problems with a rapidly running label web and/or a rapidly running labeling machine.

The splicing device is preferably controlled with the aid of first and second scanning devices which are involved in notifying that the end of the active web is about to leave the empty supply spool and the second scanner device that picks up the image located on the running web is activated. It is particularly beneficial that a sensor which is present in any event on a labeling machine to control the proper positioning of the label web withdrawal is used as a second scanner device in the sense of dual functioning. As an alternative to this, however, a separate sensor arranged with each multi-functional drum to pick up a printed label image on the web and to control proper positioning of the splicing device is also possible.

The invention also features providing a spray jet on the splicing device in the area of each multi-functional drum to supply liquid glue to the leading or trailing ends of the webs. These can, when using the appropriate glue applicator, be connected to the labeling machine and can be controlled by means of the scanning devices. The result is that a glue station which is always present on a labeling machine can also be used in the splicing device.

It is also advantageous, according to the invention, that the leading end of the web is inserted under a gripper finger with a lever to raise the gripper finger that closes after a 180° rotation of the drum. Alternatively, the splicing operation can be terminated after only a 170° rotation of each drum, where the gripper finger is still arranged in its open state of readiness. After inserting the replacement web under the gripper finger, the drum, with the aid of a manual wheel, can be readily transferred into the 180° drum operating position.

How the foregoing features and other features of the new label web splicing device are achieved will be evident in the ensuing description of embodiments of the invention which refer to the accompanying drawings.

DESCRIPTION OF A PREFERRED EMBODIMENT

Figure 1:
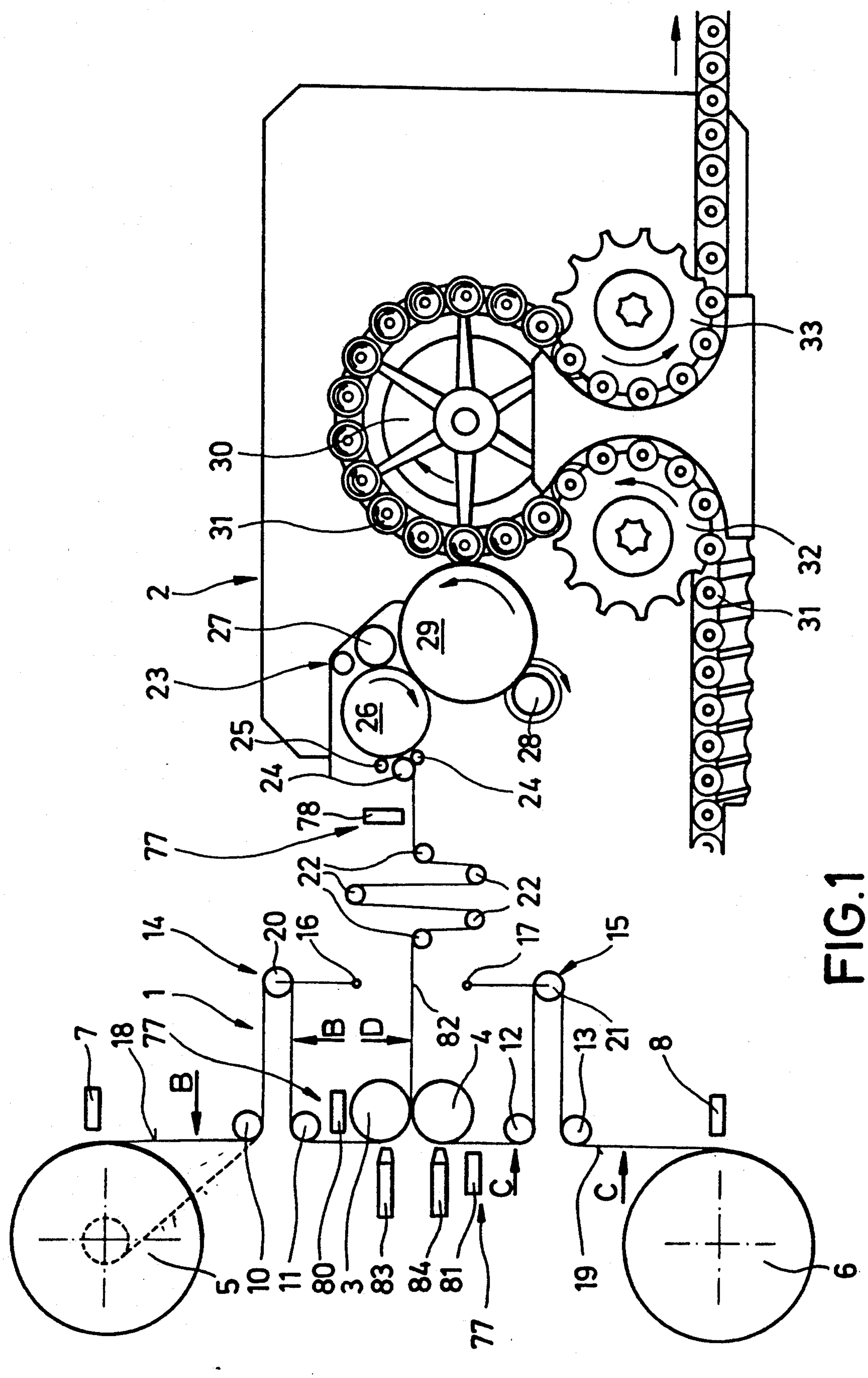
FIG. 1 is a schematic top plan view of the new label web splicing device arranged upstream of a container labeling machine.

FIG. 1 is a schematic top plan view of a container labeling arrangement including a splicing device designated generally by the reference numeral 1 and a labeling machine designated generally by the reference numeral 2 The splicing device 1 comprises two rotating multi-functional drums 3 and 4 arranged with their axes parallel and with a small clearance between them. There is a web supply reel or spool 5 from which drum 3 can draw web and there is a web supply spool 6 from which drum 4 can draw web. There are scanner devices 7 and 8 proximate to web supply spools 5 and 6, respectively The web from the supply spool 5 source passes over guide rollers 10 and 11 and the alternative web from supply spool 6 passes over guide rollers 12 and 13 Two tension compensating arrangements 14 and 15 include compensation rollers 20 and 21. Compensation rollers 20 and 21 are supported so as to swivel around axes 16 and 17, respectively A web 18 on which labels are printed is fed from supply spool 5 to multi-functional drum 3 and a web 19 on which labels are printed are fed from supply spool 6 to multi-functional drum 4. During operation of the labeling machine, which is generally designated by the numeral 23, one of the webs, such as web 18, is fed continuously by means of components on drum 3 to the labeling machine 23. The alternate or replacement web 19 from supply spool 6 at such time would be fed to multi-functional drum 4 where it would be held in readiness for its leading end to be spliced through the trailing end portion of web 18 when the supply of web 18 from spool 5 has run out or is depleted. Subsequently, when supply spool 6 has run out of web 19, the leading end of web 18 is spliced onto web 19 to provide a continuous web with labels printed thereon to labeling machine 23. Thus, splicing of the webs is effected with multi-functional drums 3 and 4 as will be explained in more detail later.

There is a conventional festooning arrangement including rollers 22 over which the single ply web 82 runs toward the labeling machine. As those familiar with the art of web transport will understand, one of the rollers 22, such as the uppermost roller in FIG. 1 may be provided with means, not shown, which raise and lower the roller to control slack and tension in web 82.

The labeling machine 23 can be a known type which includes a pair of nip rollers 24 for drawing web, a stationary knife anvil 25, a drum 26 with a knife mounted to it, a date stamping unit 27, a roller 28 for applying glue to the labels and a gripper cylinder 29 which grips the glue coated labels and transfers them to consecutive containers 31.

A rotating container or bottle table 30 causes the containers 31 to pass the gripper cylinder 29 of the labeling machine where labels are applied. The conventional bottle table 30 is supplied with unlabeled containers with a screw conveyor and inlet star wheel combination 32 and the label containers are removed from the bottle table 30 by a rotating outlet star wheel 33.

Figures 2, 3, 4:
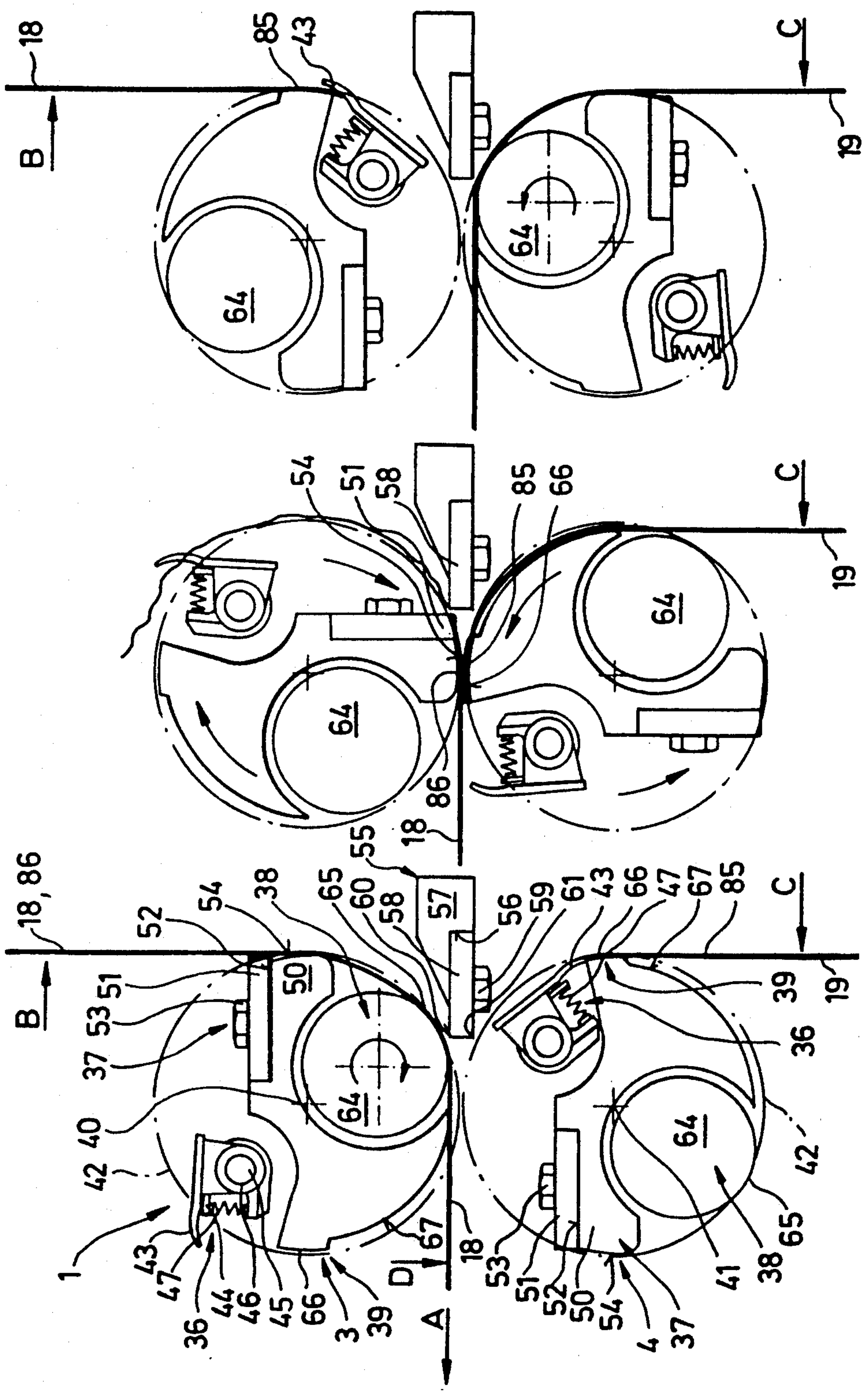
FIG. 2 is a schematic representation of the new splicing device just before starting a splicing operation.
FIG. 3 is a schematic representation of the two similar multi-function drums comprising the splicing device during a splicing operation wherein the drums are rotated by approximately 90° from their FIG. 2 position.
FIG. 4 is a schematic representation of the splicing device just after the end of a splicing operation, in a position wherein the two drums are rotated 180° from their FIG. 2 position.

Attention is now invited to FIGS. 2, 3 and 4 for a discussion of the first embodiment of the splicing device 1. The splicing device is depicted schematically in these figures In FIG. 2, label web 18 from supply spool 5 has not yet run out so it is being advanced toward the labeling machine by multi-functional drum 3. Multi-functional drum 4 is holding the leading end of the replacement label web 19 in readiness for being spliced to the trailing end of the label 18 so that the supply of labels which is properly positioned on the web will be supplied to the labeling machine 23. Drums 3 and 4 are identical. Each drum is equipped with a web gripper device 36, a pressure application member 39, a web direction changing arrangement 38 comprised of a freely turning roller 64. Since, in FIG. 2, drum 3 is active and is feeding web 18 to the labeling machine, drum 3 is rotating clockwise and so is idler or freely turning roller 64. The gripping device 36 and cutter device 37 extend radially outwardly from the circumference of the drum 3 by a very small amount. Cutting device 37 comprises a knife 51 which is fastened to a knife holder 50 by means of a series of machine screws such as the one marked 53. There is counterpressure application surface 54 in the area of drum circumference 42. Knife 51 extends axially over the total length of the drum (see FIG. 6) and has a length which at least corresponds to the width of the label web. At least the cutting edge 52 of knife 51 projects radially by a small amount outwardly beyond the drum circumference 42. When web 18 is being fed to the labeling machine 23, the web in FIG. 2 slides over counterpressure surface 54 and is guided by freely rotating roller 64. At this time, drum 3 is not rotating. When a signal is given that the web 18 is nearly depleted, drum 3 is rotated from its FIG. 2 position to its FIG. 3 position Referring to FIG. 2, this rotation will advance knife 51 rotationally in the clockwise direction whereupon the cutting edge of knife 51 will effect a shearing action on the web by virtue of the cutting edge of the knife passing closely to the cutting edge 60 of a counterknife 58. The counterknife is part of a stationary countercutter assembly 55 which comprises a counterknife holder 57 which has a recess 56 in which the counterknife blade or anvil 58 is clamped by means of a series of machine bolts such as the one marked 59. The counterknife 58 has two cutting edges 60 and 61. Cutting edge 60 is positioned for being passed closely by knife 51 on multi-functional drum 3 to thereby shear web 18 and cutting edge 61 of counterknife 58 is positioned for becoming involved in shearing of web 19 when the counterknife 51 on drum 4 is carried around counterclockwise when the leading end of web 19 is fastened to the trailing end 86 of the web 18 as will be elaborated later.

Drums 3 and 4 are driven rotationally in opposite directions at proper times by means of gears which are not illustrated and an electromagnetically actuated clutch, not shown, which in an actual embodiment is a spring friction clutch. The rotational direction of the drums is determined by the running direction of the label web between the drums. In FIG. 2, the running direction of the label web is indicated by the arrow A. When the clutch is actuated, a momentary drive connection is established between the splicing device 1 and a web withdrawal drive which is not shown. During a splicing operation each of the drums 3 and 4 carries out an approximate 180° rotation about axes 40 and 41 as depicted by the event sequence in FIGS. 2–4. As illustrated in FIG. 2, for example, the drums 3 and 4 are arranged relative to each other in a manner that rotation of drum 3 by 180° around a horizontally positioned axis that connect both the axes of rotation 40 and 41 of the respective drums and results in a position of drum 4 with the difference such that the gripper device 36 of drum 3 at FIG. 2 is opened and the gripper device 36 of drum 4 is closed already.

The gripper device 36 on each drum comprises a gripper finger 43 that projects from the circumference 42 of the drum, and a counterholder 44. The counterholder 44 is fastened to a shaft 45 and the closing force is transmitted through a compression spring 47 to the gripper finger that is supported in a manner to swivel about the axis of shaft 45 and there is a swivel bearing 46 arranged on the gripper device 36 such that the gripper device can be swiveled from a state of readiness as it is in drum 3 of FIG. 2 into an operating or gripping condition as it is in drum 4 of FIG. 2. The gripping devices on each of the drums are of course operable between gripping and non-gripping states. When holding the leading end of the replacement label web in the position of readiness, the gripper finger 43 extends beyond the drum circumference 42 as is presently the case on drum 3 in FIG. 2 In the operating or active position, gripper finger 43 is swiveled in the direction toward the drum circumference 42 so the gripper finger rests on the drum surface which is the case for gripper finger 43 of drum 4 in FIG. 2. The control of the gripper finger from the readiness position into the operating position and the reverse thereof from actuation of a roller lever 101 which is visible in FIG. 6. Roller lever 101 resides in a groove 100. For keeping the label web which extends transversely across the length of the drum on the drum circumference, a plurality of gripper devices can be arranged in parallel on the swivel axis 45 as is demonstrated in FIG. 6.

It should be noted that the web direction changing roller 64 of the deflection arrangement 38 in FIG. 2 extends parallel to the rotational axes 40 and 41 of drums 3 and 4. The freely rotating roller 64 is arranged approximately diametrically opposite of gripper device 36 on each of the drums 3 and 4.

The pressure application surfaces 66 on the drums are for squeezing the leading and trailing ends of opposite webs together when an overlapping splice is being made as is occurring in FIG. 3. When the drums rotate, a pressure application surface 66 on one of the drums reacts against a counterpressure application surface 54 on the opposite drum. The pressure application surface 66 on each drum is arranged approximately diametrically opposite of the counterpressure application surface 54. In the embodiment illustrated in FIGS. 2–4, the pressure application surface 66 is contiguous with an offset surface 67 which is set back from the circumference of the drum so as to prevent damage to the drum from the knife 51 on one drum as it passes the opposite drum.

Figure 5:
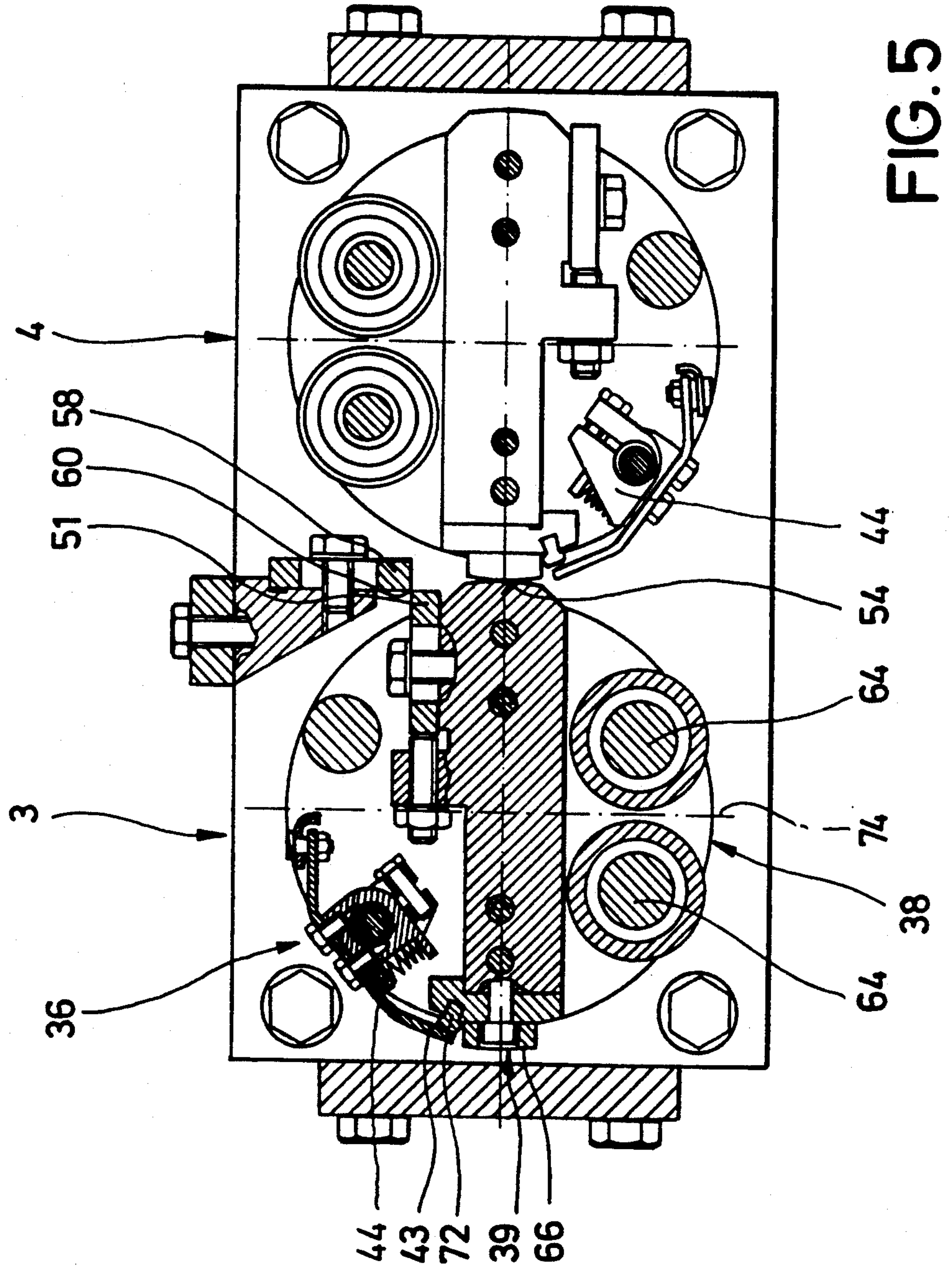
FIG. 5 is a lateral sectional view taken through a second illustrative embodiment of the splicing device.
Figure 6:
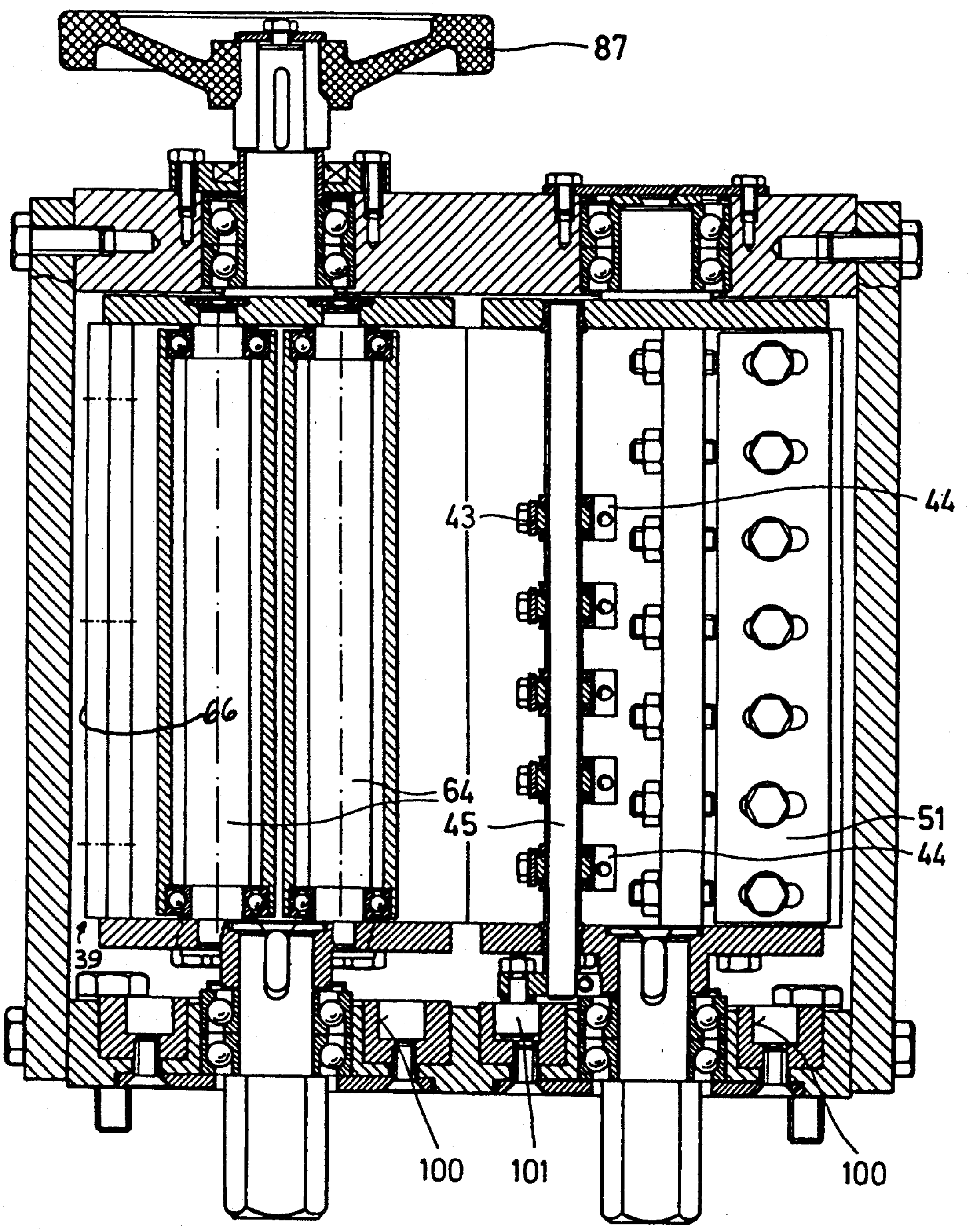
FIG. 6 is a longitudinal sectional view taken through the splicing device shown in FIG. 5.

Before describing a complete splicing operation in reference to FIGS. 2–4, a second illustrative embodiment of the splicing device will be discussed in reference to FIGS. 5 and 6 wherein the position of the drums with respect to each other corresponds approximately to the positions of the drums in FIG. 3. In FIG. 5, the cutting edges 60 of counterknife 58 and the cutting edge of knife 51 act together in order to cut the trailing end of the label web which is not illustrated in FIG. 5. In the FIG. 5 embodiment, the deflection arrangement 38 includes two rollers 64 symmetrically arranged with respect to an axis 74. Rollers 64 extend over the entire length of the drum as is evident in FIG. 6. The pressure application device 39 in the FIGS. 5 and 6 embodiment have the pressure application surfaces 66, which, like the counterpressure application surface 54 is also constructed short of projecting radially from the circumference of either of the drums 3 or 4. In this embodiment, the pressure application and counterpressure application surfaces are arranged exactly diametrically opposite of each other.

Referring to FIG. 1, in addition to the scanning devices 7 and 8 which are proximate to the respective supply spools 5 and 6, respectively, there is second scanning device 77 associated with the splicing device for the purpose of picking up an image located on the running web end. The second scanning device 77 can be comprised of a sensor 78 that is provided already on the labeling machine 2 for proper position control of web withdrawal, or there can be separate sensors 80 and 81 associated with the respective drums 3 and 4. The first scanning devices 7 and 8 can be brought to act on the supply spool 5 or 6 mechanically and/or electrically and/or optically and/or electronically, independent of whether the printed label side points toward the scanning device or not. The second scanning device 77 acts mainly optically and/or electronically and is associated with the label side This is characterized in FIG. 1 in relation to the label web 18 with the aid of the arrow B and in relation to label web 19 with the aid of arrow C. The label web 82 which has passed the splicing station at the two drums 3 and 4 presents the label on the web upwardly over on the side of the web which is indicated by the arrow D in FIG. 1.

As shown in FIG. 1, near each of the drums 3 and 4 there is a spray jet 83 and 84 which is arranged to be active at the beginning of a web or the end of a web or at the beginning and end of the web for the purpose of applying liquid glue to the web. The spray jets 83 and 84 can be controlled with the help of scanning devices 7, 8 and 77 and are connected to the glue roller 28 of the labeling machine by means of glue delivery lines which are not illustrated.

To insert the leading end of the web 85 under the gripper finger 43 a hand lever that is not illustrated is provided. The lever permits the gripper finger to be raised away from the pressure application surfaces 66 in FIGS. 2–4 or 72 in FIG. 5. Instead of a hand lever, a handwheel 87, shown in FIG. 6, can be provided on one of the drums 3 or 4 to further turn the respective drum together with the drum opposite of it and coupled to it, and to have the gripper finger transfer the drum provided with the handwheel out of the readiness position, permitting the supply of the leading end of the web and entry into the operating position that forcefully applies the web. A further rotation of the drum by handwheel 87 usually takes place when the drum only carries out a 170° rotation during the splicing operation and is further rotated into the 180° operating position with the handwheel.

Figure 7A:
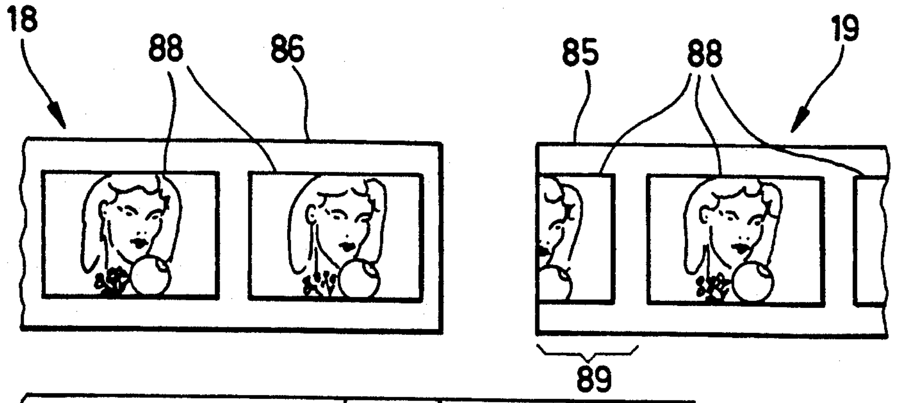
FIG. 7 composed of parts 7A to 7D is a schematic representation of the fit-cut of the leading and trailing ends of the respective replacement depleting webs correlated with the operating position of the splicing device.
Figure 7B:
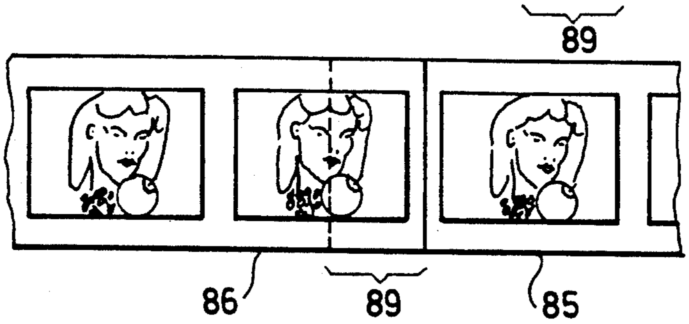

The method carried out with the new splicing device is described as follows. For present purposes it is assumed that the label web 82 in FIG. 1 is first withdrawn from supply spool 5 and supplied to the mechanism 23 of the labeling machine 22 and while web is being withdrawn from supply spool 5 the diameter of the spool steadily decreases. Meanwhile the label web stored on supply spool 6 remains at rest. A splicing operation is initiated when the first scanning device 7 associated with spool 5 indicates that the end of the web 18 is being approached as represented by the dot-dashed line running between spool 5 and roller 10 in FIG. 1. The exact time at which the splicing device is tripped to become operative is indicated by a sensor that checks the printed images 88 of the withdrawn label web 18 in FIG. 7A in order to assure proper position control. For this purpose, the sensor 78 that is provided for use in the labeling machine 2 for proper position control of the withdrawn web can be used. It must be assumed that, during conversion from one label web to another, the tripping time or initiating moment for the splicing device to act does not always coincide with the recognition time of a printed reference mark that is provided on the image by the sensor, provided that this is not arranged so as to be movable along the fixed distance between the knife 25 and the splicing device 1. The time difference between the recognition time point and the trip time or initiation point for the splicing device can be solved in a simple manner by known technology involving means for a performance-dependent time delay signal, not shown, whereby the time is dependent on the length of the label as well as the momentary label capacity, and can be correspondingly programmed.

The tripping or initiating time for splicing device 1 can be established by the sensors 80 or 81 associated with the drums 3 or 4, respectively, in order to determine on one hand the proper position of the beginning of the web held in a position of readiness and to determine on the other hand the proper point in time to transfer the leading end of the web into the splicing position; that is, to determine the position of the label on the running web.

If the first scanner device that is arranged on the supply spool that is running indicates that the web on the supply spool is running out, then the second scanner device that recognizes the printed image is activated, with the help of which the splicing device is set into motion by the proper positioning of the running label web. FIG. 2 shows the position of the drums 3 and 4 during withdrawal of label web 18 from supply roll 5. At this time the label web 18 is being continuously withdrawn from the supply roll 5 and is running over freely rotating roller 64 in the direction of arrow A to the labeling machine 2. During this normal run of the label web 18 the roller 64 turns but the drums 3 and 4 do not rotate. During a splicing procedure initiated by first and second scanner devices 7 or 8, respectively, 77, 89, 81 an electromagnetically actuated clutch, not shown, establishes a momentary driving connection between the splicing device 1 and the web withdrawal device in the form of nip rolls 24 of the labeling mechanism 23 so that drums 3 and 4 carry out rotational movements corresponding to FIGS. 3 and 4. After the splicing is completed the clutch is disengaged again. The leading end 85 of the web 19 which is to be spliced is positioned in correspondence with drum 4 in FIG. 2 where the leading end is fastened to the pressure application surface 66 with the help of a gripper finger 43 which is in operating or gripping position. When the drums 3 and 4 are coupled to the web withdrawal drive the drums are driven synchronously in counterrotation in the operating direction of the label web according to arrow A, whereby the leading end 85 of the web is rapidly accelerated to the web withdrawal speed and transferred into the splicing position illustrated in FIG. 3. The tension compensating roller 21 which is arranged between the supply spool 6 on drum 4 makes compensation possible between the leading end of the web which is accelerated to withdrawal speed and the stationary supply spool which cannot be accelerated to the predetermined withdrawal speed as quickly as desired because of the relatively great inertia of the spool with a full reel of web on it. The compensating roller 21, however, serves to maintain a certain label web tension required to provide a clean splice. The leading end 85 of the web fastened to drum 4 is transferred from the operating position of FIG. 2 into the splice position of FIG. 3 and glued together with the trailing end 86 which is the remainder of the web 18 in FIG. 3 which was previously being fed to the labeling machine. It is, therefore, required that the leading end of the web be provided with some kind of adhesive such as tape, glue or solvent before the trailing end of the tape is transferred to splicing position. In the illustrated embodiment, adhesive is sprayed on the tape with either spray jet 83 or 84 associated with each drum 3 or 4 which can be connected with the corresponding glue mechanism of the labeling machine 2 and can also be controlled along with it through the provided sensor control of the splicing device 1. In FIG. 3, the drums 3 and 4 have rotated approximately 90° compared to the positions of the drums shown in FIG. 2. In the FIG. 3 positions, the pressure application surface 66 and the counterpressure surface 54 cooperate such that the leading end 85 of the web 19 located between them is pressed into glued relation in an overlapping area. Immediately after gluing, the remaining end of the formerly fed web is cut by knife 51 shearing the web against counterknife 58. The gripper finger 43 is controlled with a concentrically arranged cam groove 100 (see FIG. 6) fixed underneath the drum and a cam follower lever 101. The shape of the curve of the groove is such that the gripper fingers are opened at the moment of glue contact and the glued leading end of the web is freed. While in the position of FIG. 3, the rollers 64 remain essentially at rest while the drums 3 and 4 carry out a counterrotational movement in which case drum 3 rotates in a clockwise direction and drum 4 rotates in a counterclockwise direction. The drums 3 and 4 carry out an approximate 180° of rotation during the splicing operation so that finally label web 19 is removed from supply spool 6 over the freely rotating roller 64 of drum 4, whereby the leading end 85 of the web is fastened to a new label web 18 belonging to a new full supply spool on drum 3. As shown in FIG. 4, the label web 19 is withdrawn over freely turning roller 64 while the drums 3 and 4 are at rest.

Figure 7C:
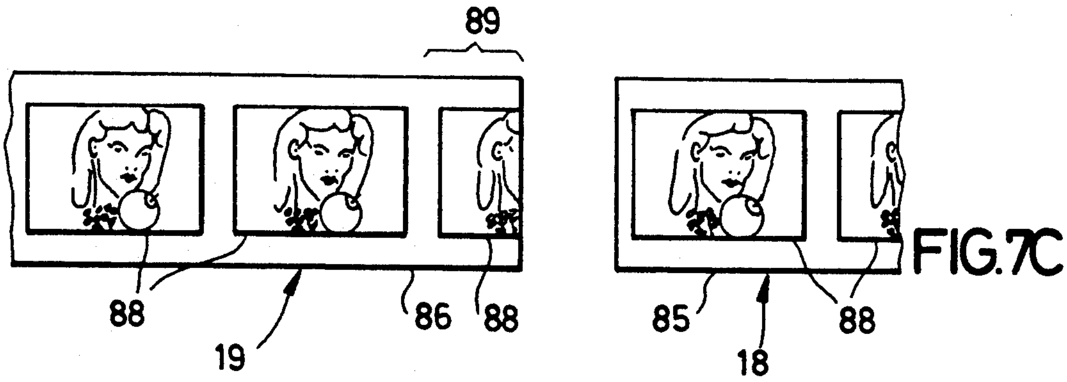
Figure 7D:
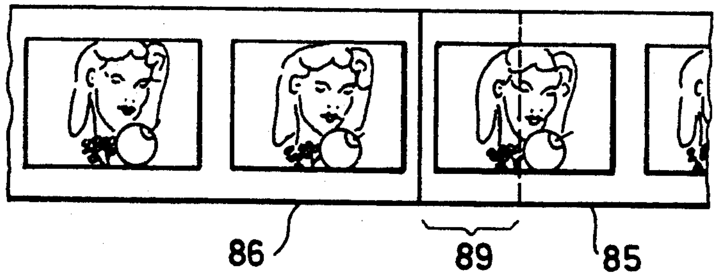

The manner in which the webs are cut or spliced with assurance that the printed matter constituting a label will be matched and continuous as if there were no splices made between one part of a label on one web and the other part on another web will now be discussed in reference to FIGS. 1, 2–4 and 7A to 7B. In FIG. 1 the side of the unwinding label web 18 on which the labels are printed is arranged on the outside, that is, facing drum 3 as indicated by the arrows B and D in FIGS. 1 and 2. The leading end 85 of the web 19 is, as shown in FIG. 3, glued on with its printed side on the unprinted side of the web 18 which is expiring or running out. When the new label web 19 is cut to fit, the leading end of the web 85, which, during overlapping gluing, is glued with the printed side on the unprinted end of the web 86 of label web 18 which is running out, is not cut exactly on the separation line between two printed images 88, but rather is cut previously by the width of the overlapping area 89 (see FIG. 7A). The label web 18 that is expiring, on the contrary, is cut to fit exactly between two printed images 88. A properly positioned splice therefore yields a label web according to FIG. 7B. This procedure is also followed during the subsequent cut of the label web 19 to fit a new leading end 85 of the label web 18, when the empty supply spool 5 is replaced with a full spool In this case, however, the leading end of the label web 85 as in FIG. 4 is glued on its unprinted side indicated by arrow B against the printed side, indicated by the arrow C, of the label web 19. In this case the trailing end 86 of the label web 19 that is ending preferably is not cut exactly on the separation line between two printed images 88, but rather cut later by the width of the overlapping area 89, while the leading end 85 of the new label web 18 is cut to fit exactly between two printed image 88 according to FIG. 7C. In this case the result after gluing is a label web such as is depicted in FIG. 7D. The proper cut of the label web that is expiring or running out can be achieved most simply with proper controlling for the coupling of the splicing device to drive to obtain label web withdrawal which, as explained earlier, differs depending on the respective label web which is to be cut.

The result is that a printed image of the new label web is seamlessly connected to the printed image of the label web that is running out so that no container 31 needs to be sorted out because it has an imperfect label.

Insertion of a new leading end of the web under the gripper finger can be accomplished with a hand lever which is not illustrated in great detail, for raising the already closed gripper finger 43 when the splicing device carries out a 180° rotation during the splicing operation according to FIGS. 2–4. If the splicing operation only occurs with a 170° rotation of the drums 3 and 4, the gripper fingers are located in the open readiness position so that the leading end of the new web can be inserted. Next, one of the drums is transferred into the 180° operating position by means of handwheel 87. The driving connection of the two drums through the gear train which is not illustrated causes the automatic synchronous rotation of the other drum.

It should be understood that it is possible to arrange the rotational axes 40 and 41 of drums 3 and 4, respectively, either vertically as shown in FIGS. 1–4 or alternatively, horizontally as is not shown. In the vertical case, the splicing device 1 requires relatively little height and a guide roller which is intended as a deflection roller or direction changing roller between the splicing device 1 and the glue applicator 24 can be eliminated. In the second horizontal case the supply spools 5 and 6 are arranged nearly vertically with the rotational axes of drums 3 and 4 arranged horizontally on top of each other so the result is that the splicing device has a relative small width. In this case a guide roller designed as a deflection roller is provided between the splicing device 1 and the glue applicator 28 which transfers the label web from the horizontal position to a vertical position.

I claim:

1. A method of splicing the leading end of a second web to the trailing end of a first web wherein the webs have equally spaced apart labels; each of the labels having an image printed on them with equal free spaces between successive images, and the webs are fed from respective supply spools to a labeling machine, comprising the steps of:

translating the first web past a splicing position while at the same time positively mechanically gripping the leading end of the second web proximate to the splicing position, sensing when the supply of the first web is near depletion, concurrently sensing the position of one of the images on the first web relative to splicing position, to determine the time at which advancing the leading end of the second web toward the first web is to be initiated, as the trailing end of the first web approaches the splicing position, rapidly accelerating the leading end of the second web up to the running speed of the first web and into contact with the trailing end of the first web for adhesively joining the ends of the webs and simultaneously releasing the positively mechanically gripped leading end while the rotational speed of the supply spool for the second web is gradually adjusted up to a speed which results in the speed of the web fed therefrom matching the speed of the first web, cutting off one of the webs transversely of its leading end through an image on one of the labels, to leave a partial image remain on the one web, immediately after the adhesiving joining of said leading end of the second web to the trailing end of the first web and having the other of the webs cut transversely substantially centrally of said space between successive images before said webs are adhesively joined and having said webs positioned relative to each other such that when the web ends are adhesively joined, the part of the image which remains after said cutting of the one web underlays a corresponding part of the similar image on the other web and the end of the other web resulting from cutting centrally through said free space coincides with the center of the free space next to said partial image.

2. The method according to claim 1 including the steps of applying a double-sided adhesive strip to the leading end of the second web before transfer into splicing position.

3. The method according to claim 1 including the step of applying a liquid glue to the leading end of the second web before transfer into splicing position.

4. The method according to any one of claims 1, 2 or 3 wherein said cutting of the first web occurs immediately after said adhesively joining of said second web to the first web occurs.

5. The method according to claim 1 wherein said leading end of the second web is mechanically held on a rotationally drivable member and said cutting of the trailing end of the first web is performed during the time the rotationally drivable member is driven rotationally through an angle of approximately 180° at a rate that results in the speed of the leading end of the second web matching the speed of the trailing end of the first web.

* * * * *